United States Patent
Lowe et al.

(10) Patent No.: US 11,736,468 B2
(45) Date of Patent: Aug. 22, 2023

(54) ENHANCED AUTHORIZATION

(71) Applicant: Assa Abloy AB, Stockholm (SE)

(72) Inventors: Ian Lowe, Derbyshire (GB);
Francois-Eric Michel Guyomarc'h, Clermont l'Herault (FR); James William Holland, Romsey (GB)

(73) Assignee: ASSA ABLOY AB, Stockholm (SE)

( * ) Notice: Subject to any disclaimer, the term of this patent is extended or adjusted under 35 U.S.C. 154(b) by 140 days.

(21) Appl. No.: 15/067,346

(22) Filed: Mar. 11, 2016

(65) Prior Publication Data

US 2016/0277388 A1    Sep. 22, 2016

Related U.S. Application Data

(63) Continuation-in-part of application No. 62/133,633, filed on Mar. 16, 2015, and a continuation-in-part of
(Continued)

(51) Int. Cl.
*H04L 29/06*    (2006.01)
*H04L 9/40*     (2022.01)
*G06F 21/35*    (2013.01)

(52) U.S. Cl.
CPC .......... *H04L 63/0815* (2013.01); *G06F 21/35* (2013.01); *H04L 63/08* (2013.01); *H04L 63/083* (2013.01)

(58) Field of Classification Search
CPC ............. H04L 63/0807; H04L 63/0853; H04L 2463/082; H04L 63/08; H04L 63/0815;
(Continued)

(56) References Cited

U.S. PATENT DOCUMENTS 8,365,258 B2 *  1/2013  Dispensa ............ H04L 63/0869
                                                            726/5
8,863,256 B1 * 10/2014  Addepalli ............... H04W 8/26
                                                            726/7
(Continued)

FOREIGN PATENT DOCUMENTS

EP        3070632 A1    9/2016
WO   WO 2014/093613 A1  6/2014

OTHER PUBLICATIONS

Marforio et al, Secure Enrollment and Practical Migration for Mobile Trusted and Practical Migration for Mobile Trusted Execution Environments, ACM, Nov. 8, 2013, pp. 93-98.*
(Continued)

*Primary Examiner* — Luu T Pham
*Assistant Examiner* — Jenise E Jackson
(74) *Attorney, Agent, or Firm* — Schwegman Lundberg & Woessner, P.A.

(57) ABSTRACT

Confirming user consent includes prompting the user to tap a card a card reader or a computing device and confirming consent in response to the user taping the card. The user may be prompted for a response in a plurality of possible responses and only a particular one of the possible responses may require taping the card. The user may consent to installation of software on the computing device. The user may be logged in to the computing device. A login ID for the user may be cached and/or may be accessed in connection with the user tapping the card. Confirming user consent may also include obtaining a pairing code for accessing the card and confirming consent in response to the user taping the card and the pairing code allowing access to the card. The pairing code may be cached in the card reader or the computing device.

18 Claims, 12 Drawing Sheets

Related U.S. Application Data application No. 62/149,883, filed on Apr. 20, 2015, and a continuation-in-part of application No. 15/004,297, filed on Jan. 22, 2016, now abandoned.

(58) Field of Classification Search
CPC .......... H04L 63/083; G06F 21/31; G06F 2221/0711; G06F 2221/0704; G06F 21/35; G06F 21/64; G06F 21/335
USPC .................................................. 726/8
See application file for complete search history.

(56) References Cited

U.S. PATENT DOCUMENTS

| | | | |
|---|---|---|---|
| 9,106,646 B1* | 8/2015 | Zheng | G06Q 20/4014 |
| 9,124,582 B2* | 9/2015 | Kalinichenko | G06F 21/43 |
| 9,253,188 B2* | 2/2016 | Bhasin | H04W 12/068 |
| 9,332,433 B1* | 5/2016 | Dotan | H04L 63/0815 |
| 9,571,497 B1* | 2/2017 | Venkataramani | H04L 63/101 |
| 9,843,578 B2* | 12/2017 | Kalinichenko | H04L 63/0853 |
| 10,255,456 B2* | 4/2019 | Guglani | G06F 21/6245 |
| 2004/0187018 A1* | 9/2004 | Owen | H04L 9/321 |
| | | | 713/184 |
| 2005/0235148 A1* | 10/2005 | Scheidt | G06F 21/31 |
| | | | 713/168 |
| 2005/0269402 A1* | 12/2005 | Spitzer | G06Q 20/04 |
| | | | 235/380 |
| 2009/0006575 A1 | 1/2009 | Hulten et al. | |
| 2009/0095812 A1* | 4/2009 | Brown | G06K 7/0008 |
| | | | 235/380 |
| 2010/0193585 A1* | 8/2010 | Salyards | G06F 21/34 |
| | | | 235/380 |
| 2010/0250438 A1* | 9/2010 | Hamnen | G06F 21/10 |
| | | | 705/52 |
| 2011/0047610 A1* | 2/2011 | Mylavarapu | H04L 63/20 |
| | | | 726/12 |
| 2012/0084855 A1* | 4/2012 | Hofer | G06F 21/34 |
| | | | 726/18 |
| 2013/0246268 A1* | 9/2013 | Moshfeghi | G06Q 20/3278 |
| | | | 705/44 |
| 2013/0310027 A1* | 11/2013 | Foti | H04W 8/02 |
| | | | 455/432.1 |
| 2013/0318575 A1* | 11/2013 | Hart | H04L 9/3228 |
| | | | 726/4 |
| 2014/0020073 A1 | 1/2014 | Ronda et al. | |
| 2014/0074655 A1* | 3/2014 | Lim | G06Q 20/32 |
| | | | 705/26.35 |
| 2014/0108241 A1* | 4/2014 | Tunnell | G06Q 20/363 |
| | | | 705/41 |
| 2014/0122265 A1* | 5/2014 | Mardikar | G06Q 20/20 |
| | | | 705/16 |
| 2014/0207682 A1* | 7/2014 | Wolfond | G06Q 20/027 |
| | | | 705/44 |
| 2014/0250518 A1* | 9/2014 | Schneider | G06F 21/34 |
| | | | 726/9 |
| 2014/0317715 A1* | 10/2014 | Conner | G06K 19/0718 |
| | | | 726/7 |
| 2014/0344904 A1 | 11/2014 | Venkataramani et al. | |
| 2014/0378091 A1 | 12/2014 | Irwin et al. | |
| 2014/0380445 A1* | 12/2014 | Tunnell | G06F 21/00 |
| | | | 726/7 |
| 2015/0069139 A1* | 3/2015 | Narendra | G06K 19/0701 |
| | | | 235/492 |
| 2015/0082410 A1* | 3/2015 | Fitzgerald | H04L 63/08 |
| | | | 726/9 |
| 2015/0100485 A1* | 4/2015 | Skliar | G06Q 20/40145 |
| | | | 705/41 |
| 2015/0133047 A1* | 5/2015 | Smith | H04B 5/0031 |
| | | | 455/41.1 |
| 2015/0169039 A1* | 6/2015 | Teshima | G06F 1/3287 |
| | | | 713/324 |
| 2015/0245195 A1* | 8/2015 | Zhao | H04W 12/06 |
| | | | 455/418 |
| 2016/0014103 A1* | 1/2016 | Masters | G07C 9/00571 |
| | | | 340/5.61 |
| 2016/0063480 A1* | 3/2016 | Ballesteros | G06Q 20/204 |
| | | | 705/17 |
| 2016/0112397 A1* | 4/2016 | Mankovskii | H04L 63/105 |
| | | | 726/6 |
| 2016/0142424 A1 | 5/2016 | Barak et al. | |
| 2016/0148193 A1 | 5/2016 | Kelley et al. | |
| 2016/0182110 A1* | 6/2016 | Selvaraj | H04B 1/3816 |
| | | | 455/558 |
| 2016/0197948 A1 | 7/2016 | Im et al. | |
| 2016/0212129 A1* | 7/2016 | Johnston | G06F 21/73 |
| 2016/0277383 A1 | 9/2016 | Guyomarc'h et al. | |
| 2016/0292668 A9* | 10/2016 | Laracey | G06Q 20/3278 |
| 2016/0306997 A1 | 10/2016 | Spodak et al. | |
| 2016/0307190 A1 | 10/2016 | Zarakas et al. | |
| 2016/0315955 A1 | 10/2016 | Beatty et al. | |
| 2016/0330244 A1* | 11/2016 | Denton | G06F 21/6245 |
| 2017/0013451 A1* | 1/2017 | Miao | H04W 8/18 |

OTHER PUBLICATIONS

Kirkpatrick et al, Enforcing Physically Restricted Access Control for Remote Data, ACM, Feb. 23, 2011, pp. 203-212.*

Zhang et al, Location-Based Authenticaiton and Authorization Using Smart Phones, IEEE, Jun. 27, 2021, pp. 1285-1292. (Year: 2021).*

Di Pietro et al, A Two-Factor Mobile Authenticaiton Scheme for Secure Finanical Transactions, IEEE, Jun. 13, 2005, pp. 1-7. (Year: 2005).*

"U.S. Appl. No. 15/004,297, Non Final Office Action dated Mar. 8, 2017", 10 pgs.

"European Application Serial No. 16160513.4, Extended European Search Report dated Jun. 3, 2016", 6 pgs.

"European Application Serial No. 16160513.4, Response filed Mar. 3, 2017 to Extended European Search Report dated Sep. 29, 2016", 8 pgs.

"European Application Serial No. 20192585.6, Extended European Search Report dated Dec. 7, 2020", 6 pgs.

"European Application Serial No. 20192585.6, Response filed Mar. 26, 2021 to Extended European Search Report dated Dec. 7, 2020", 13 pgs.

* cited by examiner

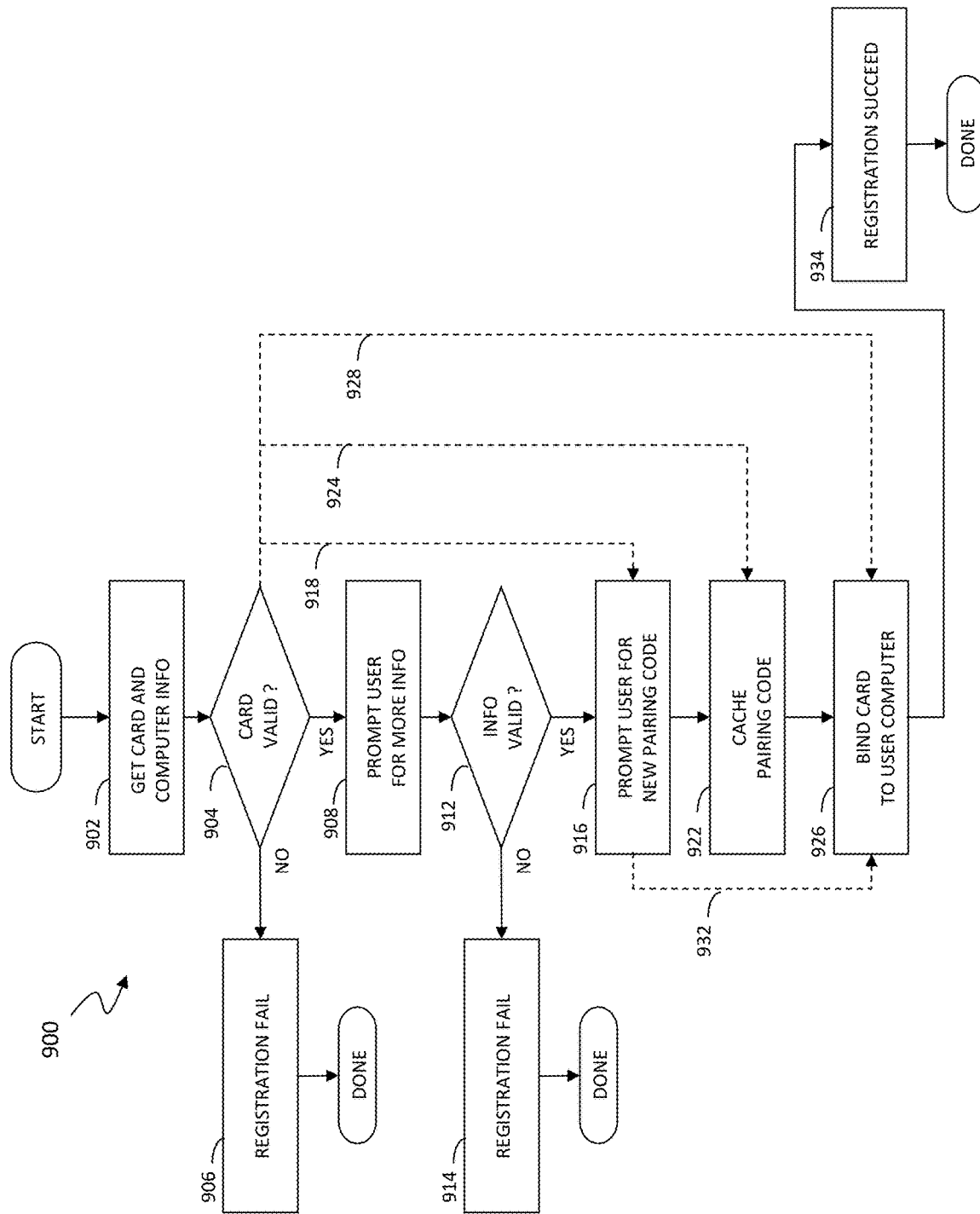

ENHANCED AUTHORIZATION

RELATED APPLICATIONS

This application claims priority to U.S. Prov. App. No. 62/133,633, filed Mar. 16, 2015, and entitled "AUTOMATIC BINDING AN ANOMYMOUS DEVICE TO A USER DURING AUTHENTICATION" and U.S. Prov. App. No. 62/149,883, filed Apr. 20, 2015, and entitled "PUSH NOTIFICATION" and is a continuation-in-part of U.S. patent application Ser. No. 15/004,297, filed Jan. 22, 2016, and entitled "BINDING TO A USER DEVICE", all of which are incorporated by reference herein.

TECHNICAL FIELD

This application relates to the field of authentication and security and more particularly to the field of authentication and security using second factor authentication.

BACKGROUND OF THE INVENTION

Active Directory Federation Services (ADFS) is a standards-based service that allows secure sharing of identity information between trusted partners (known as a federation) across an extranet. When a user needs to access a protected resource, such as a Web application from a federation partner, the organization of the user authenticates the user and provides identity information (in the form of claims) to the partner that hosts the protected resource. The claims identify the user as well as other pertinent characteristics, such as a location from which a user is accessing the federation partner and an identity of a computing device (e.g., desktop or laptop computer, tablet, smartphone, etc.) being used by the user (e.g., the computer serial number). The federation partner uses a trust policy to decide whether to authorize the user for the requested access based on the incoming claims from the user. In many cases, ADFS relies on a user entering a login identification (login id) and password to gain access to the system.

Referring to FIG. 1, a computing device screen 100 is shown with a first prompt 102 for a user. The prompt 102 includes a login id request 104 and a password request 106. In response to the prompt 102, the user may enter his login id at the login id request 104, which may have been assigned to the user by an administrator. The user may also enter a password at the password request 106, which may also have been assigned to the user by an administrator or possibly set by the user. For some systems, an initial (possibly default) password is set by the administrator and subsequently changed by the user. As the user types each character at the password request 106, the screen 100 may show a default character (e.g., "*") as a security measure to prevent others from looking over the shoulder of the user and learning the password. In some cases, the password request 106 is presented on a separate screen from the login id request 104.

There are many security issues relating to using just a login id and password to authenticate a user. In some cases, a user will write his login id and/or password and leave the paper in an insecure location (e.g., on a sticky note attached to a user's monitor). Accordingly, users are encouraged to remember their passwords rather than writing down the passwords. Some users may use the same password for many different systems as a way to "remember" their password, in which case a compromise of the user's password on one system compromises the user's password on many systems. Users are also known to use so-called "bad passwords", which are passwords commonly used and thus often guessed by malicious users. Bad passwords include "123456", "password", and "qwerty".

One way to address the insecurity of requiring only a login id and password is to also require a second authentication factor. Requiring both a login id/password combination and a second authentication factor is referred to as "two-factor authentication". In many cases, the second factor is something in possession of the user, such as a smart card or a pseudo-random number generator on a fob. Using two-factor authentication, a user would first provide the login id/password combination and then would, for example, enter a random number displayed on the fob. In such a system, even if a malicious user were to learn the login id and password combination of a user, the malicious user would still not be able to authenticate himself as the user without also possessing whatever is needed for the second authentication factor.

Although providing a second authentication factor enhances security, it also creates extra steps for the user, including requiring that the user manually enter information relating to the second factor each time. This may be especially irritating in instances where a user is repeatedly requesting authentication under the same set of circumstances. For example, a user may be accessing a Web site or a VPN a number of times using the same laptop computer. However, even though the circumstances are the same or nearly the same each time, the user may still need to perform the same authentication steps, including manually entering second factor authentication information. Accordingly, it is desirable to provide a mechanism in which a user accessing a protected resource under the same or similar circumstances each time may be able to forgo manually entering second factor authentication information each time while still maintaining the additional security provided by two-factor authentication.

SUMMARY OF THE INVENTION

According to the system described herein, confirming user consent includes prompting the user to tap a card a card reader or a computing device and confirming consent in response to the user taping the card. The user may be prompted for a response in a plurality of possible responses and only a particular one of the possible responses may require taping the card. The user may chooses a response from a plurality of possible responses and may confirm a particular choice by taping the card. The user may be prompted for a response in a plurality of possible responses and taping the card may provide a particular one of the possible responses. The particular one of the possible responses may be a default response that is changeable by the user. The user may be prompted for a response in a plurality of possible responses and the user may tap the card in a specific location of a computer screen to provide a particular one of the possible responses. The user may consent to installation of software on the computing device. The user may be logged in to the computing device. A login ID for the user may be cached and/or may be accessed in connection with the user tapping the card. Confirming user consent may also include obtaining a pairing code for accessing the card and confirming consent in response to the user taping the card and the pairing code allowing access to the card. The pairing code may be cached in the card reader or the computing device.

According further to the system described herein, a non-transitory computer-readable medium contains software that confirms user consent. The software includes executable code that prompts the user to tap a card at a card reader or a computing device and executable code that confirms consent in response to the user taping the card. The user may be prompted for a response in a plurality of possible responses and only a particular one of the possible responses may require taping the card. The user may chooses a response from a plurality of possible responses and may confirm a particular choice by taping the card. The user may be prompted for a response in a plurality of possible responses and taping the card may provide a particular one of the possible responses. The particular one of the possible responses may be a default response that is changeable by the user. The user may be prompted for a response in a plurality of possible responses and the user may tap the card in a specific location of a computer screen to provide a particular one of the possible responses. The user may consent to installation of software on the computing device. The user may be logged in to the computing device. A login ID for the user may be cached and/or may be accessed in connection with the user tapping the card. The software may also include executable code that obtains a pairing code for accessing the card and executable code that confirms consent in response to the user taping the card and the pairing code allowing access to the card. The pairing code may be cached in the card reader or the computing device.

According further to the system described herein, providing access to a protected resource includes obtaining a first authentication factor for a user that is accessing the resource using a computing device, prompting the user to provide a second authentication factor, accessing the second authentication factor using a pairing code, determining if the second authentication factor is bound to the computing device, and allowing the user to access the protected resource in response to the first and second authentication factors being valid and the second authentication factor being bound to the computing device. The user may be prompted to tap a card to provide the second authentication factor. The first authentication factor may be a login id and password combination. The login id, the password, and/or a corresponding ticket may be cached in the computing device. The second authentication factor may be a security card. Information on the security card may be encrypted and may be accessible using a pairing code. The information on the security card may include a one time password and/or a serial number for the card. The information on the security card may be protected for integrity and authenticated. Providing access to a protected resource may also include binding the security card to the computing device by storing data that includes the serial number for the card and/or a serial number for the computing device. Providing access to a protected resource may also include binding the security card to a user by storing data that includes the serial number for the card and/or an identifier for the user. Allowing the user to access the protected resource may include generating an ADFS token for the user and wherein the AFDS token allows access to the resource. The second authentication factor may be a cell phone and/or a security token having wireless communication capability.

According further to the system described herein, a non-transitory computer-readable medium contains software that provides access to a protected resource. The software includes executable code that obtains a first authentication factor for a user that is accessing the resource using a computing device, executable code that prompts the user to provide a second authentication factor, executable code that accesses the second authentication factor using a pairing code, executable code that determines if the second authentication factor is bound to the computing device, and executable code that allows the user to access the protected resource in response to the first and second authentication factors being valid and the second authentication factor being bound to the computing device. The user may be prompted to tap a card to provide the second authentication factor. The first authentication factor may be a login id and password combination. The login id, the password, and/or a corresponding ticket may be cached in the computing device. The second authentication factor may be a security card. Information on the security card may be encrypted and may be accessible using a pairing code. The information on the security card may include a one time password and/or a serial number for the card. The information on the security card may be protected for integrity and authenticated. The software may also include executable code that binds the security card to the computing device by storing data that includes the serial number for the card and/or a serial number for the computing device. The software may also include executable code that binds the security card to a user by storing data that includes at least one of: the serial number for the card and an identifier for the user. Allowing the user to access the protected resource may include generating an ADFS token for the user and wherein the AFDS token allows access to the resource. The second authentication factor may be a cell phone and/or a security token having wireless communication capability.

BRIEF DESCRIPTION OF THE DRAWINGS

Embodiments of the system described herein are explained with reference to the several figures of the drawings, which are briefly described as follows.

FIG. 9 is a flow diagram illustrating in more detail registration of a card according to an embodiment of the system described herein.

DETAILED DESCRIPTION OF VARIOUS EMBODIMENTS

The system described herein provides a mechanism for binding a second factor authentication device, such as a security card or a smartphone, to a specific computing device used by a user or possibly directly to the user so that, after the binding, the user does not need to manually reenter second factor authentication information. The binding may be performed in a secure fashion. Subsequent accessing using the second authentication factor may confirm the authenticity of the second factor authentication device without the user needing to manually reenter any second factor authentication information.

Figure 1:
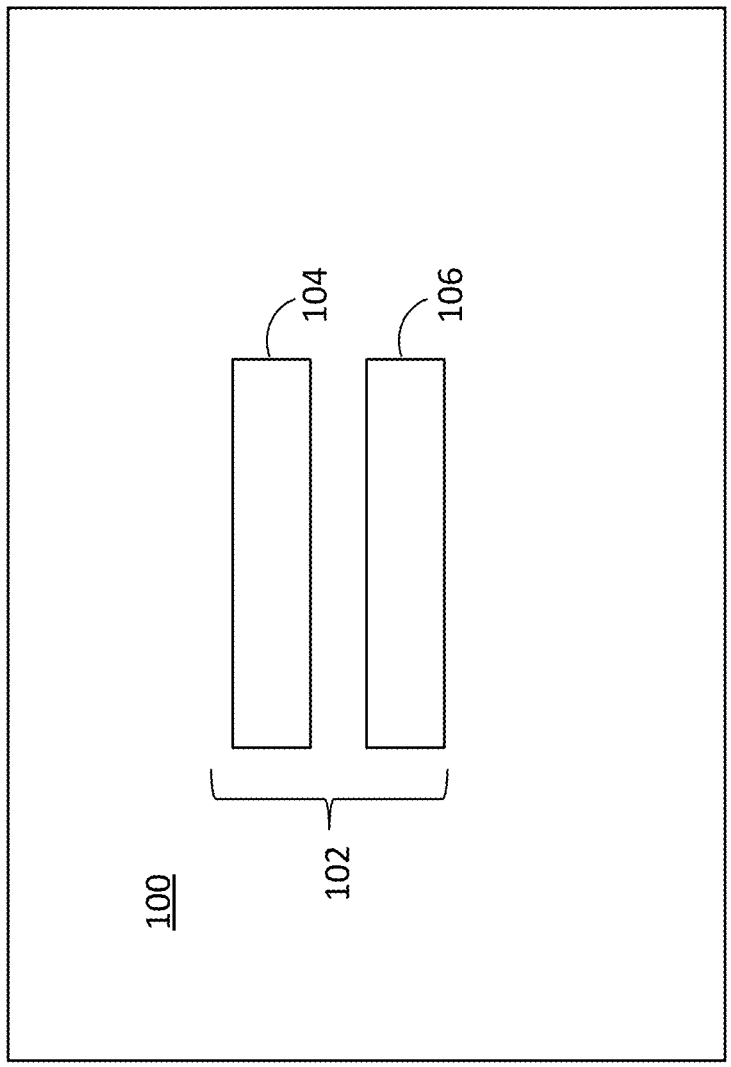
FIG. 1 is a schematic illustration showing a screen with a conventional login id prompt and a password prompt.
Figure 2:
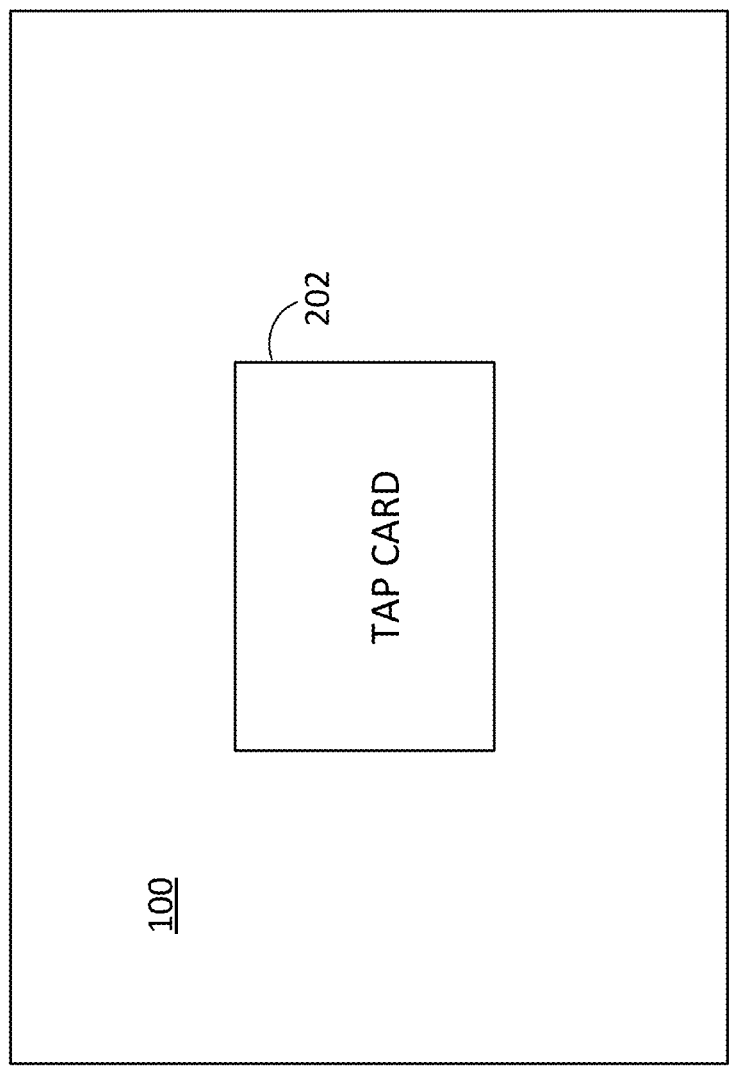
FIG. 2 is a schematic illustration showing a screen with a user prompt to tap a card according to an embodiment of the system described herein.

Referring to FIG. 2, the screen 100 is shown with a prompt 202 to urge the user to tap his card. As explained in more detail elsewhere herein, the user tapping his card provides a second factor of authentication that supplements the user also having entered a login id and password. Note that, as used herein, tapping may include placing the card in close proximity to a reader. After a registration process, the user does not need to manually enter any second factor authentication information in connection with taping his card. In an embodiment herein, the card is an iCLASS® Seos® contactless smart card, but other types of cards could be used and, in some cases, it is possible to use a smartphone in place of a card or possibly use a token with wireless communication capabilities. Following the user tapping their card, the user is either granted or denied access to a protected resource, as explained in more detail elsewhere herein.

Figure 3B:
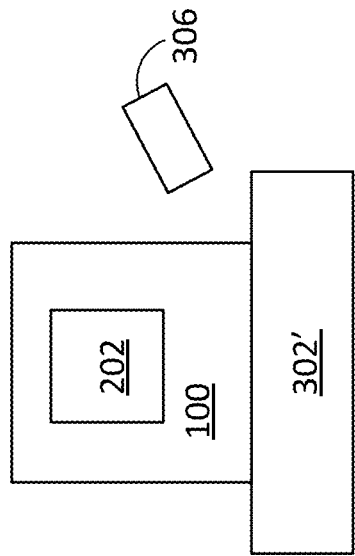
FIG. 3B is a schematic illustration showing a computing device and a card used to provide one tap authentication according to an embodiment of the system described herein.
Figure 3A:
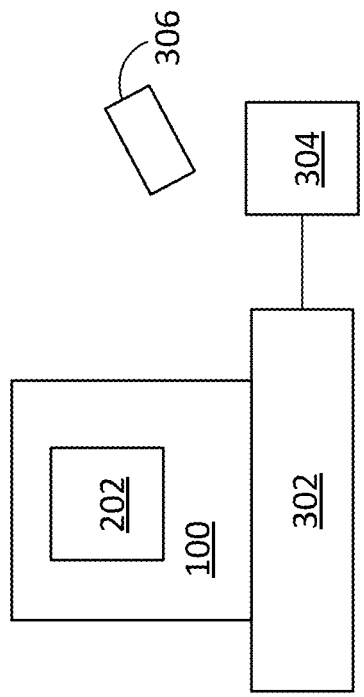
FIG. 3A is a schematic illustration showing a computing device, a card reader, and a card used to provide one tap authentication according to an embodiment of the system described herein.

Referring to FIG. 3A, the screen 100 and the prompt 202 are shown on a computing device 302, such as a conventional laptop or desktop computer. Note that although the system is described herein using a personal computer, other similar devices may be used instead, including a tablet, a smartphone, etc. The computing device 302 is coupled to a card reader 304, which may be an iCLASS® contactless card reader, although other types of appropriate embedded card readers may be used, including embedded smartphone, laptop, desktop, tablet, etc. readers. In response to the prompt 202, the user taps a card 306, which may be an iCLASS® Seos® contactless smart card, to the reader 304. Upon successful authentication (described in more detail elsewhere herein), the user is granted access to a protected resource via the computing device 302.

Referring to FIG. 3B, a computing device 302' is provided that is similar to the computing device 302, described above, except that the computing device 302' is capable of reading the card 306 directly without a dedicated card reader. In an embodiment herein, the card 306 uses NFC communication and the computing device 302' includes NFC capabilities. However, other communication mechanisms may be used, such as Bluetooth® communication technology, WiFi, etc. Note also that, as discussed elsewhere herein, the card 306 may be implemented using a smartphone or even a token with wireless communication capabilities.

Figure 4:
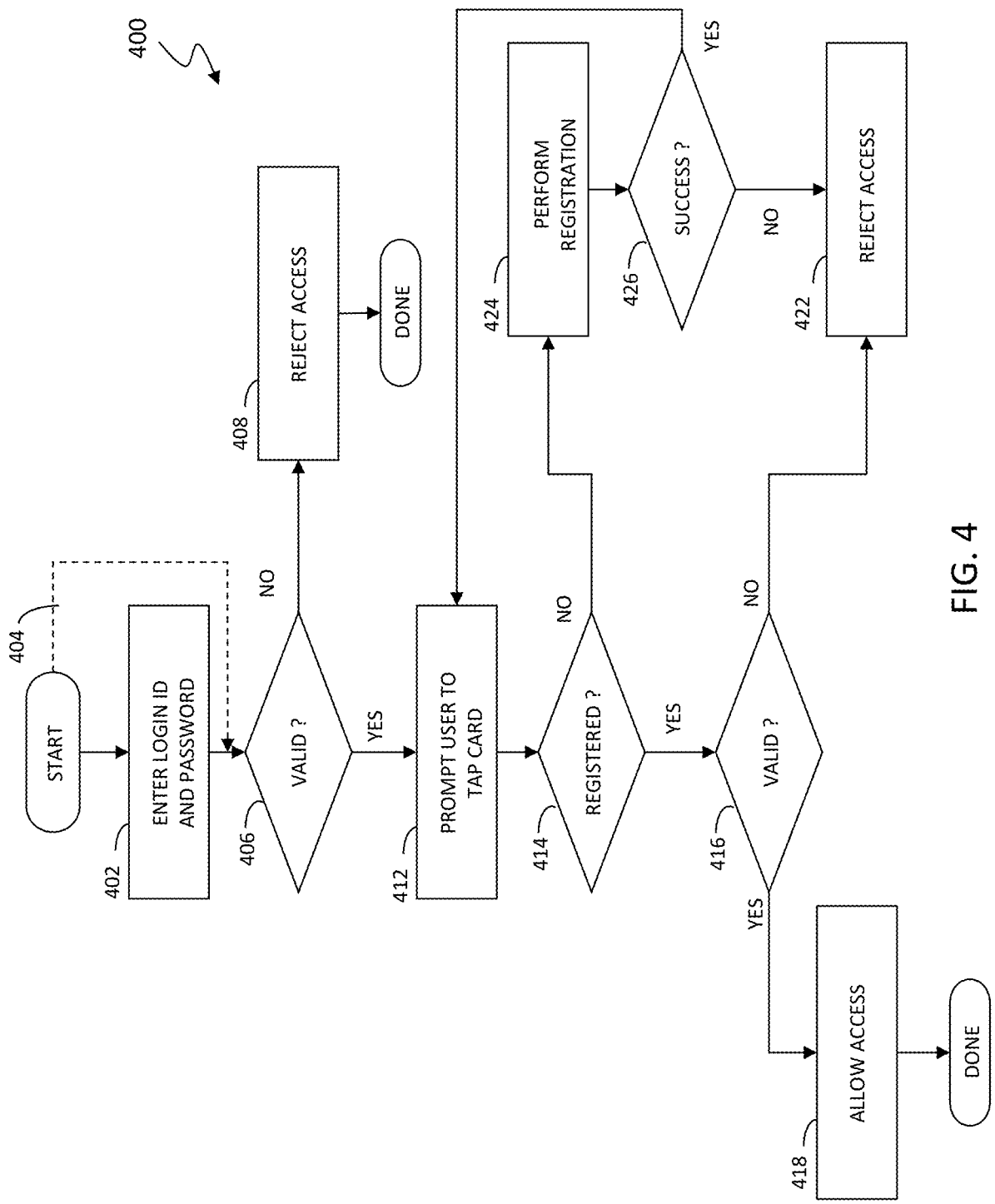
FIG. 4 is a flow diagram illustrating a user experience when authenticating using one tap access according to an embodiment of the system described herein.

Referring to FIG. 4, a flow diagram 400 illustrates a user experience obtaining access to a protected resource according to the system described herein. The protected resource may be, for example, a VPN, a Web page or a set of Web pages at a remote site, etc. Generally, a protected resource may be anything that requires user authentication in order to obtain access. At a first step 402, the user enters a login id and a password, as described elsewhere herein. Note that, in some cases, a user may forego the step 402 if the login id and the password (or possibly a "ticket" representing the login id and password values) are cached in the computing device that the user is using. That is, in some cases, the computing device may store actual login id and password information (least secure option) or an (AFS or OAuth or Kerberos) authentication ticket representing a login id and/or password from a previous login session and may be able to provide one or both automatically at an appropriate point of a user session (i.e., at a login prompt). An alternative path 404 represents the login id and the password (or ticket) being cached and thus not being provided by the user.

Following the step 402, or the alternative path 404, is a test step 406 where it is determined if the login id and password combination are valid. In some instances, the login id may not correspond to any registered user of the system while in other cases, the entered password may not be correct for the login id that is supplied. If it is determined at the step 406 that the user-supplied login id and password combination are not valid, then control transfers from the test step 406 to a step 408 where user access is rejected. Following the step 408, processing is complete. Note that the processing performed at the steps 406, 408 may be enhanced by, for example, providing the user with an opportunity to reenter the login id and password a predetermined number of times (e.g., three) and possibly preventing further entry after the predetermined number of times pending a reset by an administrator.

If it is determined at the test step 406 that the previously-provided login id and password are valid, then control transfers from the test step 406 to a step 412 where the user is prompted to tap his card (or smartphone) at a reader or directly at the computing device of the user, as described in more detail elsewhere herein. Following the step 412 is a step 414 where it is determined if the card (or similar) is registered to the computing device being used by the user. The determination at the step 414 is provided by an authentication system that is separate from the user and the computing device being used by the user, as described in more detail elsewhere herein. If it is determined at the step 414 that the card (or similar) is already registered, then control transfers from the test step 414 to a test step 416 where it is determined if the card is valid. Just as with the step 414, the determination at the step 416 is provided by an authentication system that is separate from the user and separate from the computing device being used by the user, as described in more detail elsewhere herein.

If it is determined at the step 416 that the card (or similar) is valid, then control transfers from the test step 416 to a step 418 where the user is allowed access to the protected resource. Allowing the user access to the protected resource at the step 418 is described in more detail elsewhere herein. Following the step 418, processing is complete. If it is determined at the test step 416 that the card (or similar) is not valid, then control transfers from the test step 416 to a step 422 where the access attempt is rejected (e.g., by providing a message to the user and redirecting the user to a generic Web page). Following the step 422, processing is complete.

If it is determined at the test step 414 that the card (or similar) that the user tapped at the step 412 is not registered (e.g., bound to the computing device of the user), then control transfers from the test step 414 to a step 424 where the user registers the combination of the card (or similar) and the computing device being used by the user. Registration at the step 424 is provided by an authentication system that is separate from the user and the computing device being used by the user, as described in more detail elsewhere herein. Following the step 424 is a test step 426 where it is determined if the registration performed at the step 424 was successful. If so, then control transfers from the step 426 back to the step 412, discussed above, where the user is prompted again to tap his card (or similar). Otherwise, if it is determined at the step 426 that registration was not successful, then control transfers from the test step 426 to the step 422, discussed above, where the access attempt is rejected. Following the step 422, processing is complete.

Figure 5:
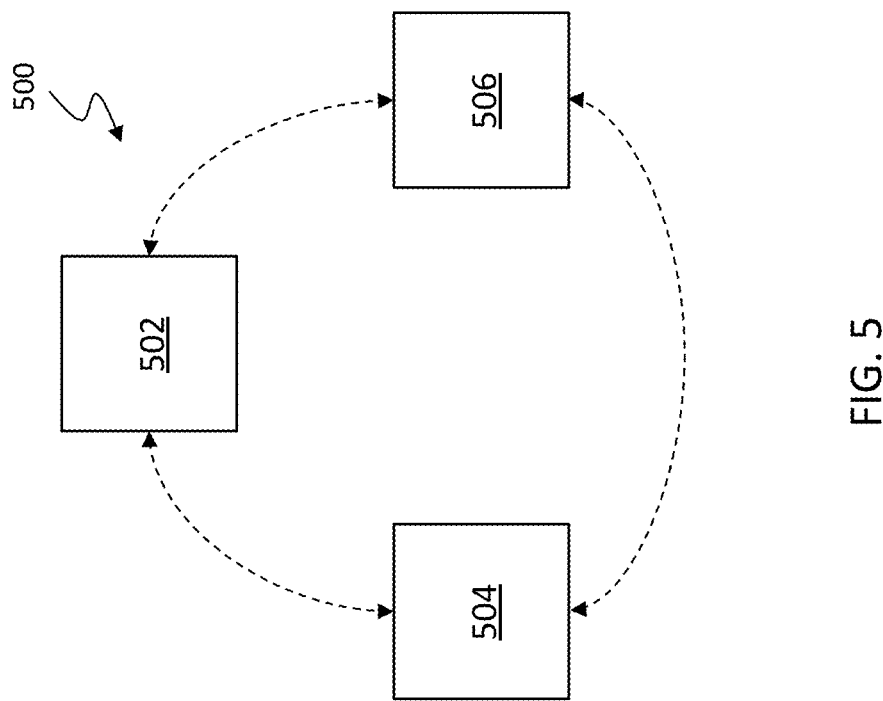
FIG. 5 is a schematic illustration showing a user site, a protected resource site, and an authentication site according to an embodiment of the system described herein.

Referring to FIG. 5, a diagram 500 illustrates a user site 502, a protected resource site 504, and an authentication site 506. The user site 502 includes a user and a computing device being used by the user to access one or more protected resources, such as a VPN or a Web page or a set of Web pages. The protected resource site 504 includes one or more protected resources as well as appropriate security mechanism(s) for controlling access to the protected resource(s), consistent with the system described herein. In an embodiment herein, the resource(s) at the site 504 are protected using Microsoft Active Directory Federated Services (ADFS) so that the protected resource site 504 includes an ADFS agent and possibly other ADFS components, as appropriate, to provide the functionality discussed herein. The authentication system site 506 includes authentication components used by the system, such as an Active Directory Domain Controller (for authenticating users) and other components, such as a component to generate ADSF tokens used by the protected resource site 504, as described in more detail elsewhere herein. The authentication site 506 may contain additional components that are integrated with the ADFS components at the authentication system site 506 to provide the functionality described herein. Note that all or some the sites 502, 504, 506 may be physically/geographically separated or may be co-located, depending upon specific implementation details.

When a user at the site 502 first attempts to access a particular protected resource at the site 504, an agent at the site 504 (e.g., an ADSF agent) notices that the user has not presented an appropriate ADSF token needed to access the particular protected resources. In such a case, the agent redirects the user to the authentication site 506 so that the user may enter credentials to obtain an ADSF token. If the user is properly authenticated at the authentication site 506, the user receives the ADSF token that allows the user access one or more protected resources at the site 504, including the particular protected resource. Note that the ADFS tokens may be digitally signed, and thus relatively unforgeable. Authenticating the user at the authentication site 506 is discussed in more detail elsewhere herein.

Figure 6:
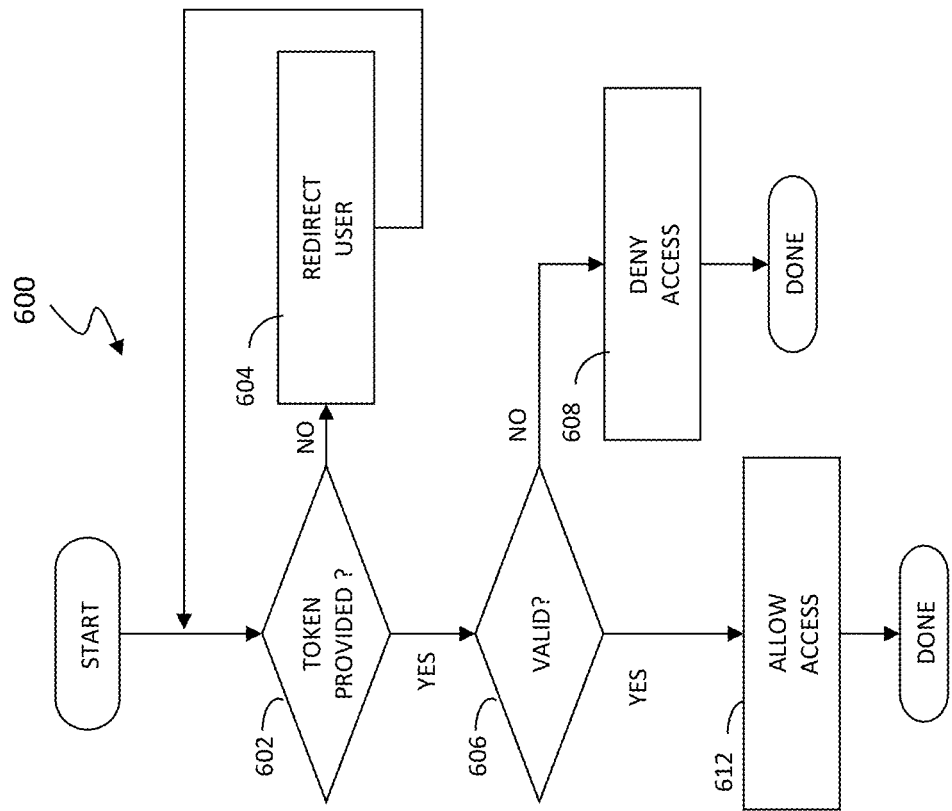
FIG. 6 is a flow diagram illustrating processing performed at a resource site according to an embodiment of the system described herein.

Referring to FIG. 6, a flow diagram 600 illustrates processing performed at the protected resource site 504 in connection with determining whether a user should be provided with access to a particular protected resource (or possibly set of resources), such as a restricted Web page or set of Web pages. Processing begins at a first test step 602 where it is determined if the user has provided a token that is acceptable for gaining access to the particular protected resource. If not, then control transfers from the test step 602 to a step 604 where the user is redirected to the authentication site 506. At the authentication site 506, the user is validated and issued a token, provided that the user is otherwise authorized to access the particular protected resource. Processing at the authentication site 506 is described in more detail elsewhere herein. Following the step 604, control transfers back to the step 602 for a follow on iteration.

If it is determined at the step 602 that a user token is available, then control transfers from the test step 602 to a test step 606, where it is determined if the token presented by the user is valid. There may be a number of reasons why a token may not be valid. For example, in some cases, a token may expire a certain amount of time after issuance (e.g., ten hours). In other cases, a token may be valid for some types of access, but may not be valid for the particular type of access being requested by a user. That is, a token may be valid for accessing protected resources only in a first set of protected resources, but the user is requesting access to a protected resource that is not in the first set. If it is determined at the step 606 that the token is not valid, then control transfers from the test step 606 to a step 608 where the attempt by the user to access the protected resource is rejected. Processing provided at the step 608 may include any appropriate processing, such as providing the user with a message, inviting the user to reauthenticate, etc. Following the step 608, processing is complete. If it is determined at the step 606 that the token is valid for the user to access the particular protected resource(s), then control transfers from the test step 606 to a step 612 where the user is allowed access. Following the step 612, processing is complete.

Figure 7:
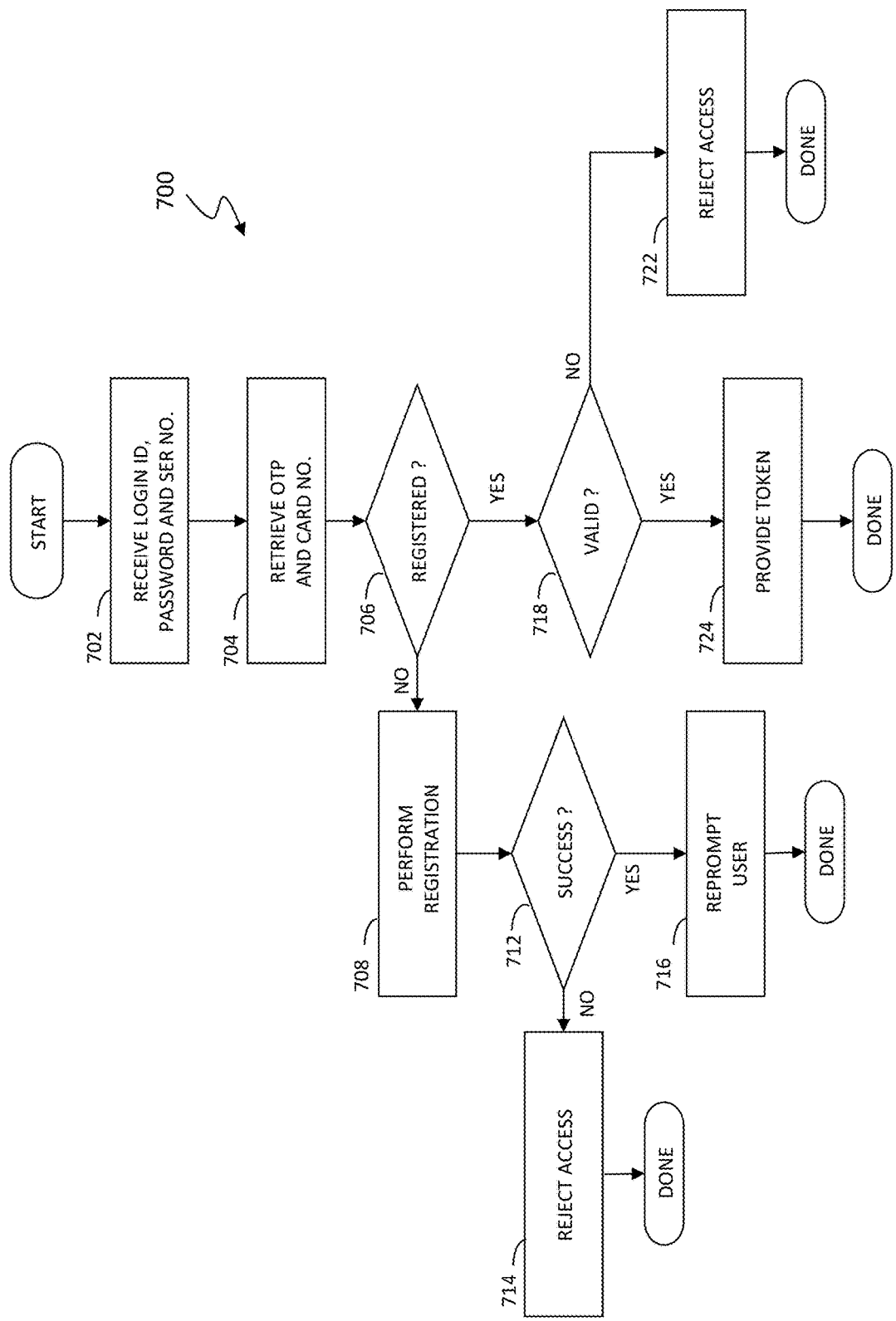
FIG. 7 is a flow diagram illustrating processing performed at an authentication site according to an embodiment of the system described herein.

Referring to FIG. 7, a flow diagram 700 illustrates processing performed at the authentication system site 506 in connection with authenticating and re-authenticating users. Processing begins at a first step 702 where the authentication system receives a login id/password combination and computing device identification information (e.g., serial number). The login id/password combination may be a conventional user login id and a password (either assigned by an administrator or chosen by the user), as discussed elsewhere herein. The computing device identification information identifies the particular computing device being used by the user. As discussed elsewhere herein, the authentication system determines if the card 306 being used by the user is already bound to the particular computing device being used by the user. In some embodiments, it is possible to bind the second authentication factor device (e.g., card, smartphone, etc.) to a particular user and not to any specific device.

In some instances, the user may also provide a pairing code, which may be a sequence of numbers (or a sequence of numbers, letters, or special characters) used by the computing device 302 or the computing device 302' to access the card 306 (or similar) of the user. In an embodiment herein, the card 306 contains encrypted data that may only be accessed by providing the pairing code. The pairing code may be installed on each card at the time of provisioning the card and/or programmed into the card after manufacture. In some cases, every card may be initially programmed with a default pairing code that a user modifies (possibly is required to modify) upon first user of the card. Thus, potentially, every new card would have the same (and/or a predictable) pairing code but cards that have been registered would have a different pairing code that would be difficult for a malicious user to ascertain. In some cases, every card may be initially programmed with no personal data and no pairing code, in which case the user may be required to enter a pairing code upon first use of the card. In an embodiment herein, a user may choose a new pairing code for accessing the card during normal operation where, instead of entering a pairing code, the user may indicate to the system a desire to reset the pairing code. In an embodiment, every card may have a unique pairing code that is registered solely to a particular user. However, in other embodiments, the pairing code may be assigned by an automated system that may or may not be part of an authentication system and/or by an administrator/supervisor. In some embodiments, each card has an administrative pairing code that may be used by an administrator to access the card and/or reset the pairing code (possibly to a default value) if the pairing code normally used to access the card is lost or otherwise not available.

In some embodiments, information on the card may be protected for integrity and authenticated using an appropriate mechanism, such as a digital signature of a trusted authority. Alternatively, information on the card may be protected for integrity and authenticated using a MAC (Message Authentication Code) where a hash value of information on the card 306 is computed with a secret shared that is also known to a receiver of the information that verifies the hash value provided with the information on the card 306. Any appropriate MAC mechanism may be used, such as the CMAC mechanism.

Following the step 702 is a step 704 where the authentication system obtains a serial number and a one-time password (OTP) (or OTP-related information, as discussed elsewhere herein) from the card 306. The serial number uniquely identifies the card 306 while the OTP ensures that the card is authentic. One time passwords may be generated using a number of means, such as RFC 4226 (HOTP: An HMAC-Based One-Time Password Algorithm), or RFC 6238 (TOTP: time-Based One-time Password Algorithm). In an embodiment herein, the OTP parameters or keys (such as the shared symmetric keys) may be installed at the time of provisioning of the card and the resulting OTP may not be directly accessible (e.g., the card only provides a one-way hash of the OTP without ever providing the OTP directly). Alternatively, the OTP may be accessible and some or all of the corresponding keys and/or parameters (if any) are made not directly accessible (inaccessible). Note that, in an alternative embodiment, it is possible to cache the user id and/or the user password and/or a corresponding ticket on the card 306 so that, once the pairing code is provided, the user does not need to enter login id and password information at the step 702.

Following the step 704 is a test step 706 where it is determined if the card is registered with the authentication system. In an embodiment herein, the authentication system maintains a list of card serial numbers, corresponding OTP parameters and/or keys, and the computing device(s) to which each card has already been bound. Binding the card 306 (or similar) to specific computing device(s) of the user is discussed in more detail elsewhere herein. If it is determined at the test step 706 that the card 306 (or similar) is not registered, then control transfers from the test step 706 to a step 708 where the card 306 is registered to bind the card 306 to the particular computing device being used by the user. Registration at the step 708 is discussed in more detail elsewhere herein. Following the step 708 is a test step 712 where it is determined if the registration performed at the step 708 was successful. As discussed in more detail elsewhere herein, registration may be unsuccessful for many reasons, such as improper authentication information provided by the user, or the user being unknown to the system or, in systems where each card can be bound to only one computing device, the card 306 having been previously bound to another computing device. If it is determined at the test step 712 that registration at the step 708 was unsuccessful, then control transfers from the test step 712 to a step 714 where user access is rejected, as discussed in more detail elsewhere herein. Following the step 714, processing is complete. Alternatively, if it is determined at the step 712 that user registration was successful, then control transfers from the test step 712 to a step 716 where a code/message is provided to the user site 502 to cause the user to be prompted again to tap his card, as discussed in more detail elsewhere herein. Note, however, that on a subsequent iteration, the test step 706 will determine a different result after the user is registered. Following the step 716, processing is complete.

If it is determined at the test step 706 that the user is registered (i.e., the card 306 is bound to the particular computing device being used by the user), then control transfers from the test step 706 to a test step 718 where it is determined if the card 306 is valid. In some cases, it is possible for a card to be registered but not valid, such as a situation where a card is stolen and/or the computing device is stolen. If it is determined at the step 718 that the card is not valid, then control transfers from the test step 718 to a step 722, where user access is rejected, as discussed in more detail elsewhere herein. Following the step 722, processing is complete. If, on the other hand, it is determined at the test step 718 that the card is valid, then control transfers from the test step 718 to a step 724 where the user is issued a software token that allows the user to obtain access to one or more protected resources, as discussed in more detail elsewhere herein. Following the step 724, processing is complete.

Figure 8:
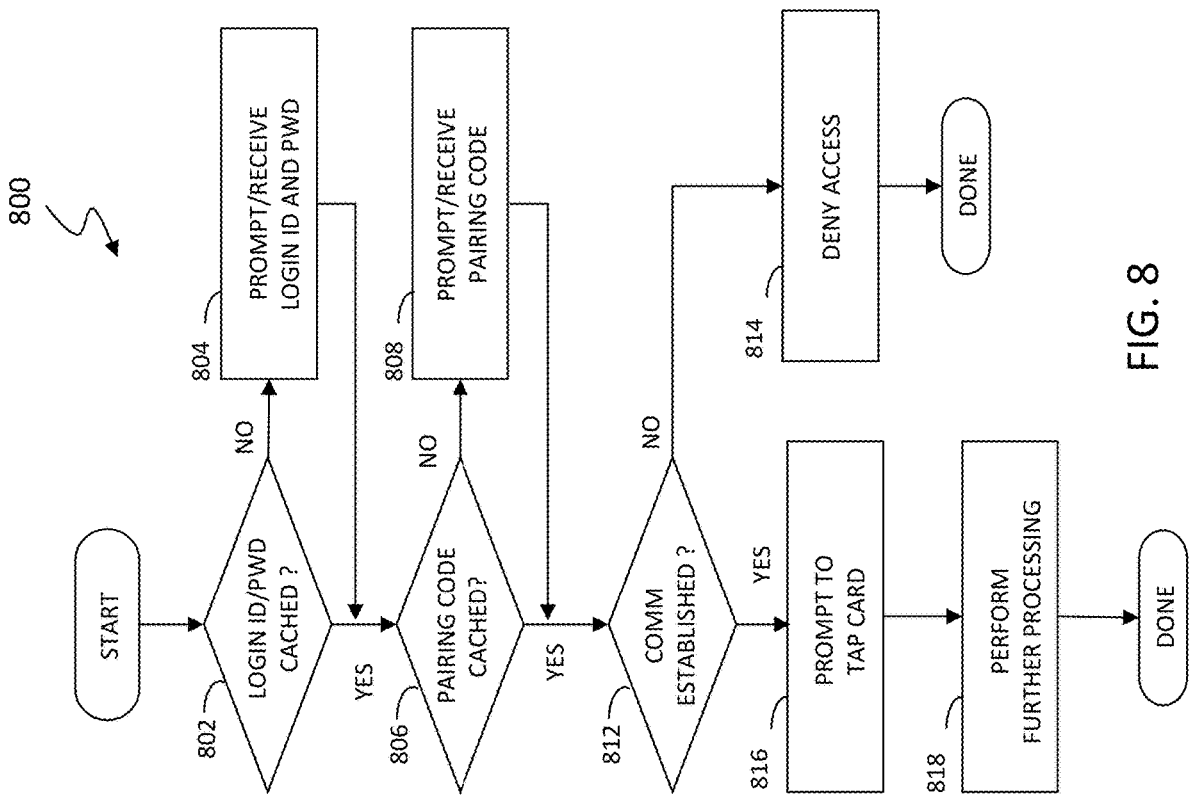
FIG. 8 is a flow diagram illustrating processing performed at a client site according to an embodiment of the system described herein.

Referring to FIG. 8, a flow diagram 800 illustrates processing performed at the user site 502. Processing begins at a first step 802 where it is determined if the user login id and password combination (or corresponding ticket, as described elsewhere herein) are already cached in the computing device of the user. In an embodiment herein, the user would enter a login id and password the first time the user is accessing a protected resource and, thereafter, the login id and password (or corresponding ticket) would be cached in the computing device so that the user does not need to reenter the same information again. If it is determined at the test step 802 that the login id and password (or corresponding ticket) are not cached in the computing device being used by the user, then control transfers from the test step 802 to a step 804 where the user is prompted to enter his login id and password combination.

Following the step 804 or following the step 802 if the login is and password are cached is a test step 806 where it is determined if the pairing code for the card 306 (or similar, such as a smartphone) is already cached in the computing device of the user. In an embodiment herein, the user would enter a pairing code the first time the user is accessing a protected resource and, thereafter, the pairing code would be cached in the computing device so that the user does not need to reenter the information again. As discussed elsewhere herein, the pairing code is used by the computing device 302 or the computing device 302' to access information on the card 306. In some embodiments (e.g., embodiments that use Bluetooth communication), the cached pairing code may be deleted from the computing device when a user physically moves away from the computing device. For example, the system may detect when the Bluetooth signal strength goes below a threshold value. If it is determined at the test step 806 that the pairing code is not cached in the computing device being used by the user, then control transfers from the test step 806 to a step 808 where the user is prompted to enter the pairing code for the card 306 (or similar).

Following the step 808 or following the step 806 if the pairing code is cached is a test step 812 where it is determined if communication is established between the card and the authentication site 506 after the pairing code is obtained (either from the user or from a cache). As discussed elsewhere herein, the pairing code may be used by the computing device 302 or the computing device 302' to decrypt and access information from the card 306. If the user enters the wrong pairing code at the step 808 (or a different pairing code is cached in the computing device), it could indicate a security violation/issue. Accordingly, if it is determined at the step 812 that communication between the card and the authentication site 506 cannot be established after the pairing code has been provided to allow access by the computing device, then control transfers from the test step 812 to a step 814 where user access is rejected, as discussed in more detail elsewhere herein. Following the step 814, processing is complete.

If it is determined at the test step 812 that communication is established between the card and the authentication system, then control transfers from the step 812 to a step 816 where the user taps his card (or similar) or otherwise causes the authentication system (discussed elsewhere herein) to access information from the card using the pairing code and authenticate the user. Following the step 816 is a step 818 where the user performs further processing, discussed elsewhere herein, such as validating access to the protected resource, registering to bind the card to a particular computing device, etc. Following the step 818, processing is complete.

Referring to FIG. 9, a flow diagram 900 illustrates in more detail processing performed by the authentication system at the step 708 of the flow diagram 700 where a user performs registration to bind a card (or similar, such as a smartphone) to a particular computing device and/or to a particular user. Processing begins at a first step 902 where data from the card (or similar) is obtained as well as identification information about the user and/or the computing device being paired with the card, such as the serial number of the computing device. As discussed elsewhere herein, the system may access encrypted information on a card using a pairing code, which is possibly provided by the user, cached in the computing device of the user, and/or a default value for a previously unused card. Information about the computing device (e.g., serial number or other unique identifier) may be obtained, for example, along with login information previously obtained by the authentication system when the user provided a login id and password.

Following the step 902 is a test step 904 where it is determined if the card is valid. The test at the step 904 may include determining validity of a serial number and one time password (OTP) stored on the card as well as possibly determining if the particular card may be used for the purpose requested (i.e., to access a particular protected resource). In some instances, there may be a restriction that each card may be bound with only one computing device so that the test at the step 904 determines if the card being registered had already been bound to a different computing device. In other embodiments, a card may be bound with more than one computing device, although it is still possible to place a restriction on the maximum number of computing devices that may be bound with a card (e.g., no more than X).

If it is determined at the test step 904 that the card is not valid, then control transfers from the test step 904 to a step 906 where the registration fails (i.e., the result of the registration process returns a fail state). Following the step 906, processing is complete. Otherwise, if the card (or similar) is valid, then control transfers from the test step 904 to a step 908 where the user may provide additional information as part of the registration process. In some embodiments, the user may be required to provide additional security information to bind a particular card to a particular computing device. In some cases, the additional information may be user-specific information that verifies the user (e.g., answer(s) to security questions). The additional information may not relate to the specific user at all, but nonetheless may provide additional security in connection with binding a card (or similar) to a computing device. For example, the additional information may relate to geolocation, where registration does not proceed unless the user is in a particular location or possibly not in a particular location. Note that this may be especially useful if card is to be bound to a device but not necessarily to a particular user since it could prevent registration of stolen devices/cards that have been taken to an unauthorized location. Following the step 908 is a test step 912 where it is determined if the additional information provided at the step 908 is OK (e.g., was the user capable of correctly answering security questions). If not, then control transfers from the test step 912 to a step 914 where the registration fails (i.e., the result of the registration process returns a fail state). Following the step 914, processing is complete.

If it is determined at the test step 912 that the additional information provided at the step 908 is OK, then control transfers from the test step 912 to a step 916 where the pairing code, which is used to access information on the card (explained elsewhere herein) is modified. Modifying the pairing code at the step 916 may include prompting the user to enter a new pairing code or may include having the system issue and assign a new pairing code. In some instances where the pairing code is issued/assigned, it is possible that the user is never made aware of the new pairing code but, instead, the pairing code is cached in the computing device of the user for subsequent accesses. Note that, in some embodiments, the step 916 may be reached directly from the test step 904, in which case the user will not be prompted to provide additional information at the step 908. That is, in some instances, once the card (or similar) is deemed valid at the step 904, control transfers directly to the step 916 to change the pairing code, without the user ever entering additional information or the system validating any additional information. This is illustrated by an alternative path 918.

Following the step 916 is a step 922 where the system caches the pairing code in the computing device of the user, as explained in more detail elsewhere herein. In some embodiments, the pairing code may be encrypted before being cached and/or may be stored in secure hardware of the computing device of the user. Note that, in some embodiments, the step 922 may be reached directly from the test step 904, in which case the user will not be prompted to provide additional information at the step 908 and the pairing code will not be changed at the step 916. That is, in some instances, once the card (or similar) is deemed valid at the step 904, control transfers directly to the step 922 to cache the pairing code, without the user ever entering additional information or the system validating any additional information or the pairing code being changed. This is illustrated by an alternative path 924.

Following the step 922 is a step 926 where the card (or similar) is bound to the computing device of the user. Binding may be provided at the step 926 by the authentication system storing, in a particular format or record, information provided at the step 902 including the card serial number and OTP and the serial number (or other identifying information) of the computing device being used by the user. The binding may be stored in a local directory (such as Active Directory Domain Services) or pushed to a separate authentication system (domain) directory in the cloud. Note that, in some embodiments, the step 926 may be reached directly from the test step 904, in which case the user will not be prompted to provide additional information at the step 908, the pairing code will not be changed at the step 916, and the pairing code will not be cached at the step 922. That is, in some instances, once the card (or similar) is deemed valid at the step 904, control transfers directly to the step 926 to bind the card (or similar) and the computing device of the user, without the user ever entering additional information or the system validating any additional information or the pairing code being changed or cached. This is illustrated by an alternative path 928. Note also that, in some embodiments, the step 926 may be reached directly from the test step 916, in which case the pairing code will not be cached at the step 922. This is illustrated by an alternative path 932. Following the step 926 is a step 934 where the registration succeeds (i.e., the result of the registration process returns a success state). Following the step 934, processing is complete.

In addition to accessing protected resources, the system described herein may be adapted to provide enhanced security for operations where a user would otherwise provide authorization by, for example, clicking OK on a dialog box. For instance, in some cases, installing new software on a computing device or authorizing java scripts or authorizing push notifications requires user confirmation which may be provided by a user clicking "OK" (or similar). However, the system described herein may be adapted to require the user to tap a card (or similar) to a computing device that has been bound to the card in order to provide confirmation for software installation, push notifications, etc. Requiring the user to tap a card in connection with selecting/declining an option provides a more secure mechanism than a system where the user may simply secure/decline the option with, for example, a mouse click.

Figure 10:
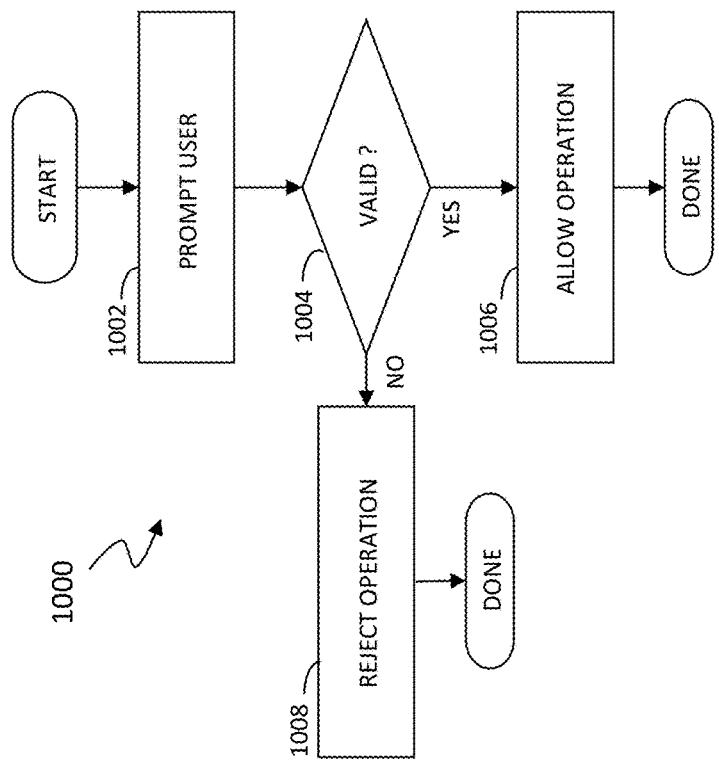
FIG. 10 is a flow diagram illustrating providing enhanced security when user confirmation is requested according to an embodiment of the system described herein.

Referring to FIG. 10, a flow diagram 1000 illustrates steps performed in connection with adapting the system described herein to provide enhanced security when a user confirmation/input is requested. Processing begins at a first step 1002 where a user is prompted to tap a card (or similar) to the computing device of the user. The prompts may be provided from any source, including a programmed push notification for a device, such as a smart phone or tablet. Following the step 1002 is a test step 1004 where it is determined if the card is valid, as described in more detail elsewhere herein (i.e., bound to the computing device, not expired, authorized for requested operation, etc.). If it is determined at the test step 1004 that the card is valid, then control transfers from the test step 1004 to a step 1006 where the operation is allowed (e.g., the user authorizes an operation). Following the step 1006, processing is complete. If it is determined at the step 1004 that the card is not valid for some reason, then control transfers from the test step 1004 to a step 1008 where the operation is denied. Following the step 1008, processing is complete.

Figure 11:
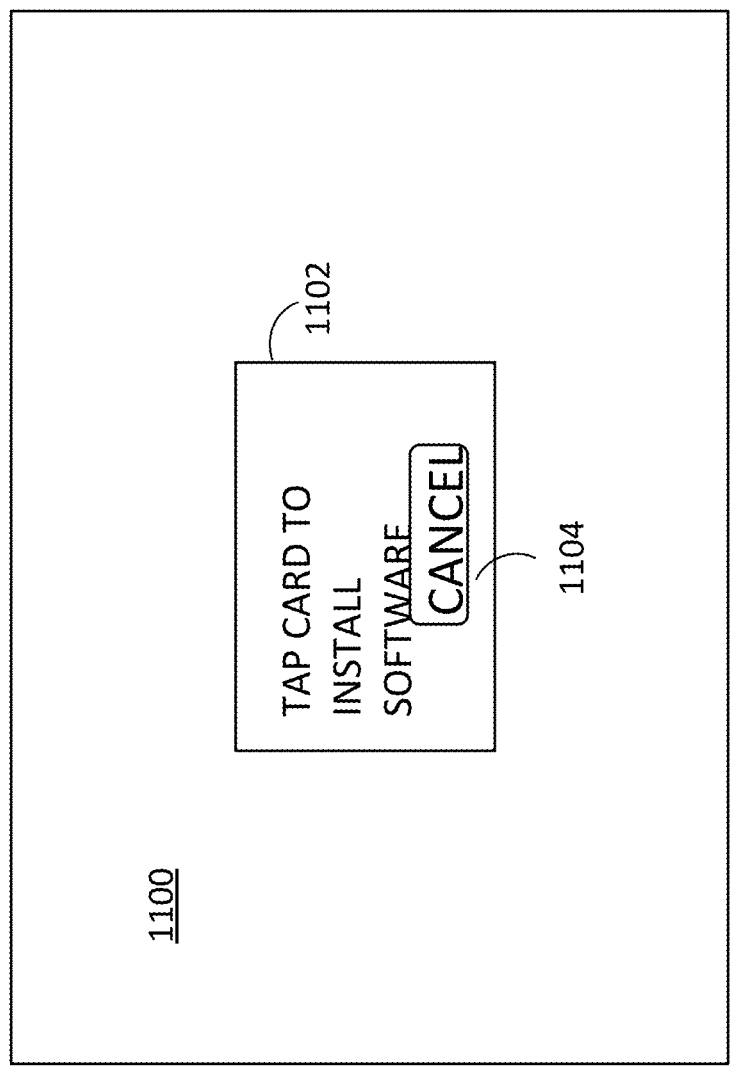
FIG. 11 is a schematic diagram illustrating a user prompt for providing enhanced security according to an embodiment of the system described herein.

Referring to FIG. 11, in some instances, a user may be presented with more than one option for a response. A prompt with more than one possible response may be handled in a number of ways. One possibility is to allow a user to select all but one of the responses in a conventional fashion (e.g., the user selects a box/button with a mouse). For the remaining response, the user could be required to tap a card. A screen 1100 shows software installation example where a prompt 1102 indicates that the user may tap their card to install software. However, the user may click a button 1104 with a mouse to decline the software installation. Note that, in some cases, it is possible to require tapping a card in order to reject an operation. For example, a system may be set up so that software updates occur automatically and, when the user is prompted for updates to proceed, the user is required to tap a card in order to decline updates.

Figure 12:
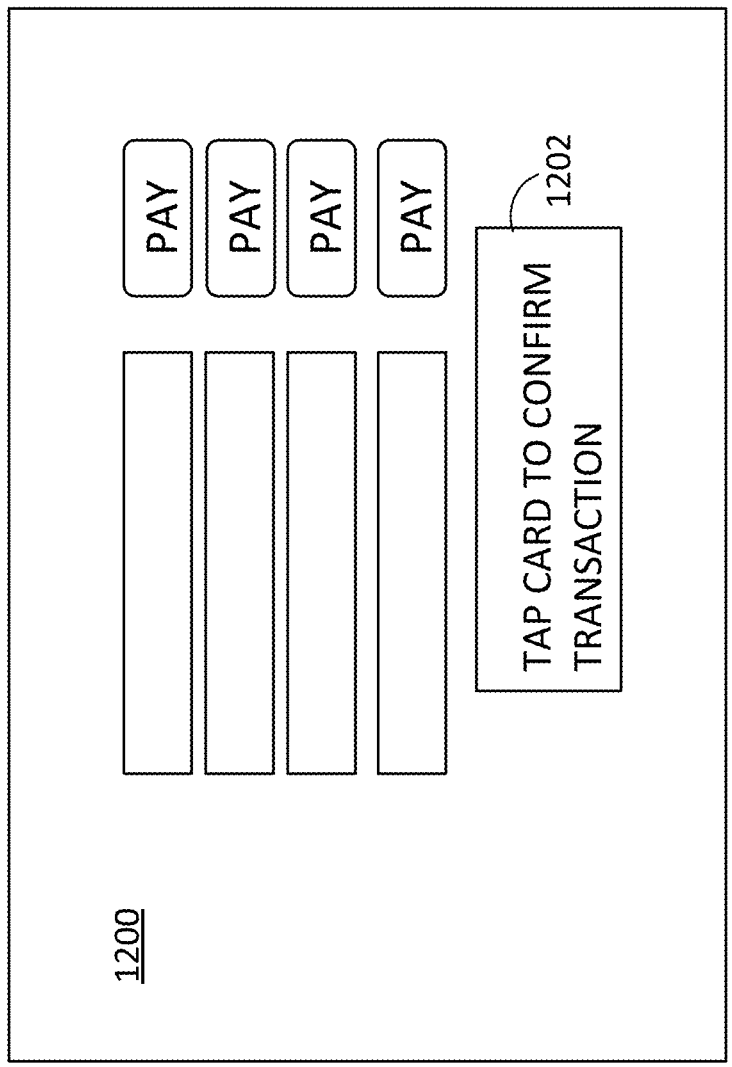
FIG. 12 is a schematic diagram illustrating a user prompt for providing enhanced security in connection with confirming operations according to an embodiment of the system described herein.

Referring to FIG. 12, a screen 1200 illustrates another possibility where the user is required to tap their card to confirm a choice that is made in a conventional fashion. The user selects a particular operations and/or responds to prompts in a conventional fashion (e.g., mouse clicks), but then is required to tap their card to confirm the selection. For example, the screen shows a bank bill paying system where a last operation in paying a bill, after the user has selected appropriate options, entered amounts, etc., is to confirm user choices by tapping a card, as indicated by a prompt 1202 to the user. Note that, in some instances, a user may scroll through a list presented on a display and then select a highlighted one of the options (or multiple options) by tapping a card (not shown in FIG. 12).

Figure 13:
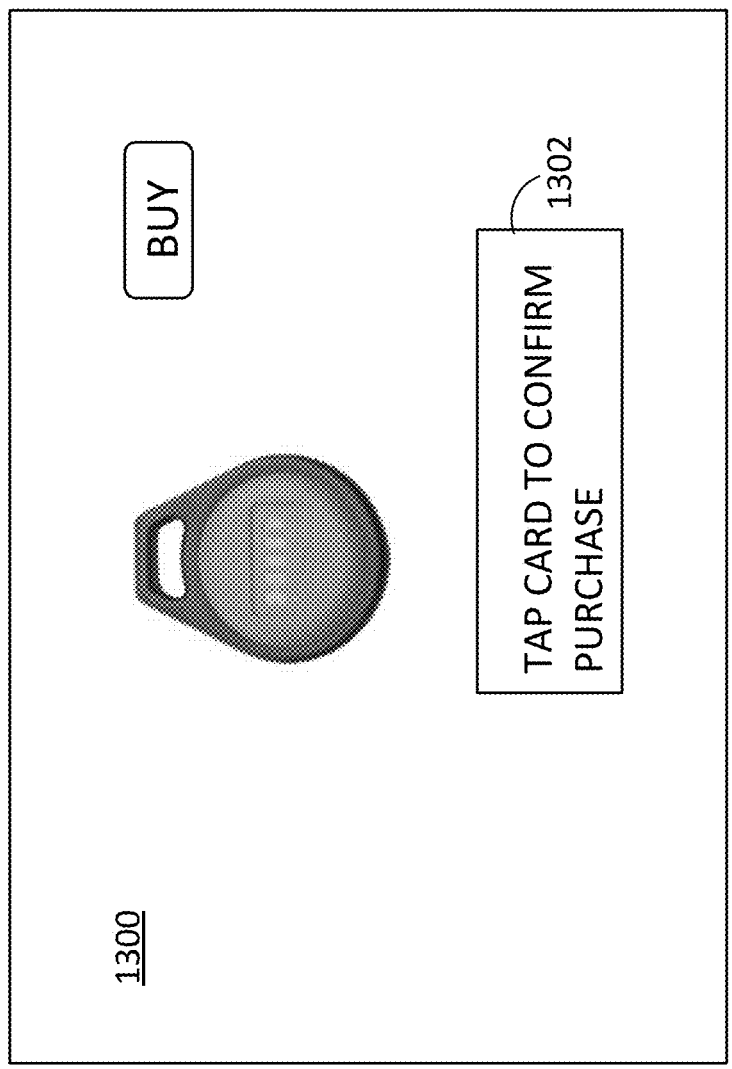
FIG. 13 is a schematic diagram illustrating a user prompt for providing enhanced security in connection with confirming a transaction according to an embodiment of the system described herein.

Referring to FIG. 13, the screen 1300 shows an instance where a user selects, in a conventional fashion, items for purchase from an on-line catalog/website and then, at the time of checkout (and/or when items are placed in a "cart"), the user is provided with a prompt 1302 for the user to tap their card. In some instances, it may be possible to loop through a series of choices (e.g., with the user pressing a down arrow or an up arrow) and having the user pick one of the choices by tapping a card.

An answer/response for a particular prompt may be stored in the card so that, when a user a prompted, tapping the card provides the answer. For instance, a user that handles purchasing items for a company may have some of the items pre-selected/authorized and stored on the card so that when the user visits a vendor website, the user taps the card to purchase the items pre-stored on the card. As another example, some users in an organization may not be allowed to install particular software while others are allowed. All users of the organization may be prompted for installation of the particular software to which the users respond by tapping their cards. For users that are allowed to install the particular software, tapping their card results in the software being installed (because an affirmative answer is pre-stored on their cards) while, for other users, tapping their card results in the software not being installed (because a negative answer is pre-stored on their cards). In some cases, only a default value/answer is stored on a card and the user is allowed to override the default answer. For example, if a card contains a number of default items to purchase from a website, tapping the card results in the default items being placed in a cart of the user, but the user is allowed to remove some or all of the default items and to possibly add items.

Figure 14:
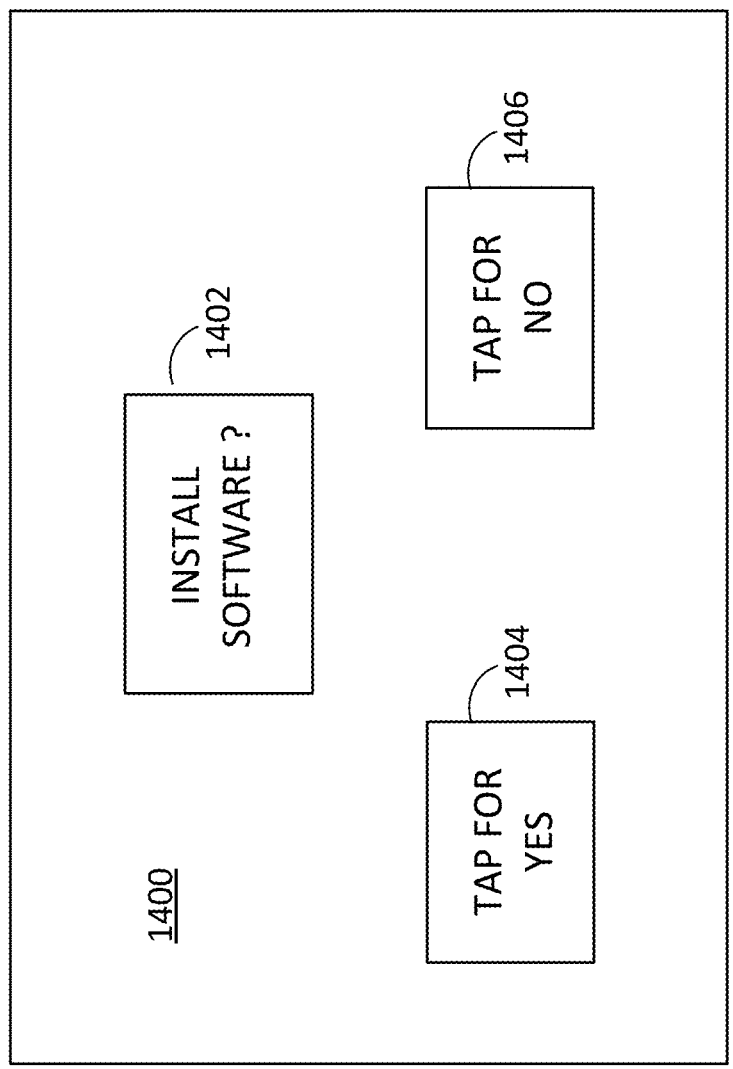
FIG. 14 is a schematic diagram illustrating a user prompt and possible responses for providing enhanced security according to an embodiment of the system described herein.

Referring to FIG. 14, a screen 1400 illustrates that, in cases where a computer screen can detect a location on the screen where a card is being tapped, the tap location may be used to determine an answer to a prompt presented to the user. The user may be presented with a prompt 1402 having a YES/NO question that the user answers by ether tapping their card on a location of the screen containing YES box/button 1404 or tapping their card on a location of the screen containing a NO box/button 1406. Similarly, the user may be presented with a list on a screen from which the user selects by tapping their card on a location of the screen containing a specific item/entry in the list.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only.

What is claimed is:

1. A method of providing access to a protected resource, the method comprising:
    obtaining a first authentication factor to access the protected resource using a computing device, wherein the first authentication factor comprises a login ID and password combination;
    prompting a user to place an authentication factor device in close proximity to a reader device associated with the computing device to provide a second authentication factor, wherein at least one of the login ID or password is cached for accessing in connection with the user placing the authentication factor device in close proximity to the reader device, wherein the authentication factor device is separate from the computing device and is one of a card, a security token having wireless communication capability, or a phone, and wherein the second authentication factor comprises information protected for integrity using one of a digital signature of a trusted authority or a Message Authentication Code (MAC);
    obtaining the second authentication factor from the authentication factor device, via the reader device, using a pairing code;
    determining if the authentication factor device had been previously bound by registration to the computing device by determining if identifying information of the authentication factor device and identifying information of the computing device are stored and associated with each other in a directory of records in an authentication system that is separate from the computing device and the authentication factor device, the directory of records comprising identifying information for one or more authentication factor devices and, for each of the one or more authentication factor devices, one or more computing devices associated therewith, wherein registration requires receipt of security information associated with a particular user of a particular authentication factor device in order to bind the particular authentication factor device with a particular computing device; and
    allowing the user to access the protected resource in response to the first and second authentication factors being valid and a determination that the authentication factor device was previously bound by registration to the computing device.

2. The method according to claim 1, wherein prompting the user comprises providing a plurality of possible response options and at least one of the possible response options requires placing the authentication factor device containing the second authentication factor in close proximity to the reader device associated with the computing device.

3. The method according to claim 1, wherein prompting the user comprises providing a plurality of possible response options and a selection of a response from the plurality of possible response options is confirmed upon placing the authentication factor device in close proximity to the reader device associated with the computing device.

4. The method according to claim 1, comprising receiving consent from the user for installation of software on the computing device.

5. The method according to claim 1, wherein the user is logged in to the computing device.

6. The method according to claim 1, wherein prompting the user comprises providing a plurality of possible response options and at least one of the possible response options requires placing the authentication factor device containing the second authentication factor in close proximity to the reader device associated with the computing device and at least one of the login ID or password is accessed in connection with the user placing the authentication factor device in close proximity to the reader device.

7. The method according to claim 1, wherein the pairing code is cached in one of: a card reader or the computing device.

8. The method according to claim 1, wherein the at least one of the login ID or password is cached in the computing device as an authentication ticket representing the at least one of the login ID or password.

9. The method according to claim 1, wherein the second authentication factor includes a device identifier and a one-time password.

10. A method for accessing a protected resource, the method comprising:
    receiving, from a first device, a first authentication factor to access the protected resource, wherein the first authentication factor comprises a login ID and password combination;
    prompting a user to place a second device in close proximity to a reader device associated with the first device to provide a second authentication factor, wherein at least one of the login ID or password is cached for accessing in connection with the user placing the second device in close proximity to the reader device, wherein the second device is separate from the first device and is one of a card, a security token having wireless communication capability, or a phone, and wherein the second authentication factor comprises information protected for integrity using one of a digital signature of a trusted authority or a Message Authentication Code (MAC);

receiving the second authentication factor from the second device, via the reader device, using a pairing code;

determining if the second device is bound by registration to the first device, wherein the second device is bound by registration to the first device if identifying information of the first device and identifying information of the second device match information stored in a record generated during a device registration process, the record comprising identifying information for one or more authentication factor devices associated with the first device, wherein the device registration process requires receipt of security information associated with a user of the second device in order to bind the second device with the first device; and allowing access to the protected resource by the first device, in response to the first and second authentication factors being valid and a determination that the second device is bound by registration to the first device.

11. The method of claim 10, wherein the first authentication factor includes an authentication ticket.

12. The method of claim 10, wherein the second authentication factor includes a one-time password.

13. The method of claim 10, wherein:
the first authentication factor includes a login ID, a password, and the identifying information of the first device; and
the second authentication factor includes a one-time password and the identifying information of the second device.

14. The method of claim 10, wherein the record generated during the device registration process is stored by an authentication system separate from the first device and the second device.

15. A method of providing access to a protected resource, the method comprising:
obtaining a first authentication factor to access the protected resource using a computing device, wherein the first authentication factor comprises a login ID and password combination;
prompting a user to place an authentication factor device in close proximity to a reader device associated with the computing device to provide a second authentication factor, wherein at least one of the login ID or password is cached for accessing in connection with the user placing the authentication factor device in close proximity to the reader device, wherein the authentication factor device is separate from the computing device and is one of a card, a security token having wireless communication capability, or a phone, and wherein the second authentication factor comprises information protected for integrity using one of a digital signature of a trusted authority or a Message Authentication Code (MAC);
obtaining the second authentication factor from the authentication factor device, via the reader device;
determining if the authentication factor device had been previously bound by registration to the computing device by determining if identifying information of the authentication factor device and identifying information of the computing device are stored and associated with each other in a directory of records in an authentication system that is separate from the computing device and the authentication factor device, the directory of records comprising identifying information for one or more authentication factor devices and, for each of the one or more authentication factor devices, one or more computing devices associated therewith; and
allowing the user to access the protected resource in response to the first and second authentication factors being valid and a determination that the authentication factor device was previously bound by registration to the computing device.

16. The method according to claim 15, wherein the at least one of the login ID or password is cached in the computing device.

17. The method according to claim 16, wherein at least one of the cached login ID or password is accessed in connection with the user placing the authentication factor device in close proximity to the reader device.

18. The method according to claim 15, wherein prompting the user to place the authentication factor device in close proximity to the reader device comprises providing a plurality of possible response options and a selection of a response from the plurality of possible response options is confirmed upon the placing of the authentication factor device in close proximity to the reader device.

* * * * *